United States Patent [19]

Baker

[11] Patent Number: 5,164,676

[45] Date of Patent: Nov. 17, 1992

[54] MACHINE FOR INSPECTING THE WALL THICKNESS OF GLASS BOTTLES

[75] Inventor: Russ J. Baker, Horseheads, N.Y.

[73] Assignee: Emhart Industries, Inc., Towson, Md.

[21] Appl. No.: 629,992

[22] Filed: Dec. 19, 1990

[51] Int. Cl.$^5$ .................. G01R 27/26; G06G 7/64
[52] U.S. Cl. ............................. 324/662; 364/473
[58] Field of Search ............ 324/671, 662, 690; 364/473, 507; 209/522, 551; 377/15, 16

[56] References Cited

U.S. PATENT DOCUMENTS

| | | |
|---|---|---|
| 4,332,606 | 6/1982 | Gardner .................. 364/473 |
| 4,413,738 | 11/1983 | Pemberton et al. ........ 364/473 |
| 4,639,263 | 1/1987 | Kulikauskas ............. 364/473 |
| 4,965,523 | 10/1990 | Baker et al. ............. 324/671 |

*Primary Examiner*—Jack B. Harvey
*Assistant Examiner*—Maura K. Regan
*Attorney, Agent, or Firm*—Spencer T. Smith

[57] ABSTRACT

A wall thickness inspecting device includes a plurality of channels that generate a voltage signal as the glass container rolls along an elongated capacitance strip. A switch is provided for operation during head cleaning which isolates the data file from bottle rejection data, and from bottle inspected data count.

2 Claims, 3 Drawing Sheets

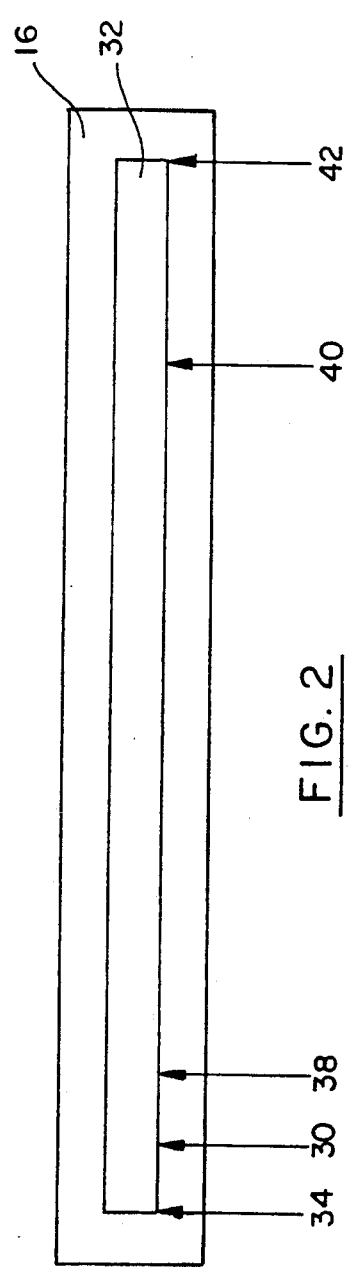
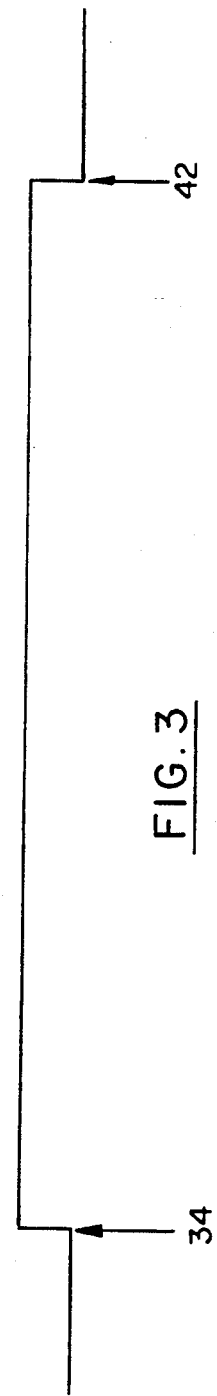
FIG. 2
FIG. 3

MACHINE FOR INSPECTING THE WALL THICKNESS OF GLASS BOTTLES

The present invention relates to equipment for inspecting the wall thickness of a glass container by evaluating sampled voltage data generated by elongated capacitance strips as the glass container is rolled along the strips.

A bottle or container is formed from a gob of molten glass in an individual section glass container forming machine by first pressing or blowing the gob into a parison and then blowing the parison into the container. When glass is uniformly distributed in this process, wall thickness will be uniform, but when glass distribution is not uniform, thin spots can occur which may result in bottle failure during filling or handling.

The high dielectric constant of glass makes it possible to measure the electrical capacitance of the wall of a glass container located against two elongated electrodes of a sensor which contact the bottle as it is rolled along the sensor. This capacitance increase monotonically as the thickness of the glass container increases and can be measured using an electronic circuit to convert the capacitance to a voltage. A voltage representative of the thickness of the wall can be continuously generated as the bottle rolls along the sensor, and if the voltage decreases below a selected value (the value which represents the minimal wall thickness), the bottle being tested can be rejected. Each sensor is a part of a discrete data channel.

Conventionally four data channels are utilized to inspect a glass container and the voltage outputted from each channel is evaluated. Random errors in any channel can cause the controller to conclude that a bottle is bad. One cause for such random errors is routine cleaning or replacement of the outer layer of tape on the capacitance strips. When the controller concludes that a bottle is being inspected and that it is to be rejected during such cleaning or replacement the data file which is maintained throughout operation will be updated to reflect that a bottle formed in mold N of Section N was rejected. Since system specifications often provide for a bottle acceptance rate of for example 95% such erroneous date makes it appear that the acceptance rate is lower than it is and therefore makes it unnecessarily difficult to secure the desired acceptance rate.

It is accordingly an object of the present invention to improve the reliability of the system data.

Referring to the drawings:

FIG. 2 is a front view of the head of an oscillator assembly of the machine shown in FIG. 1;

FIG. 3 is a representation of the signal theoretically generated by the head by an inspected bottle.

Figure 1:
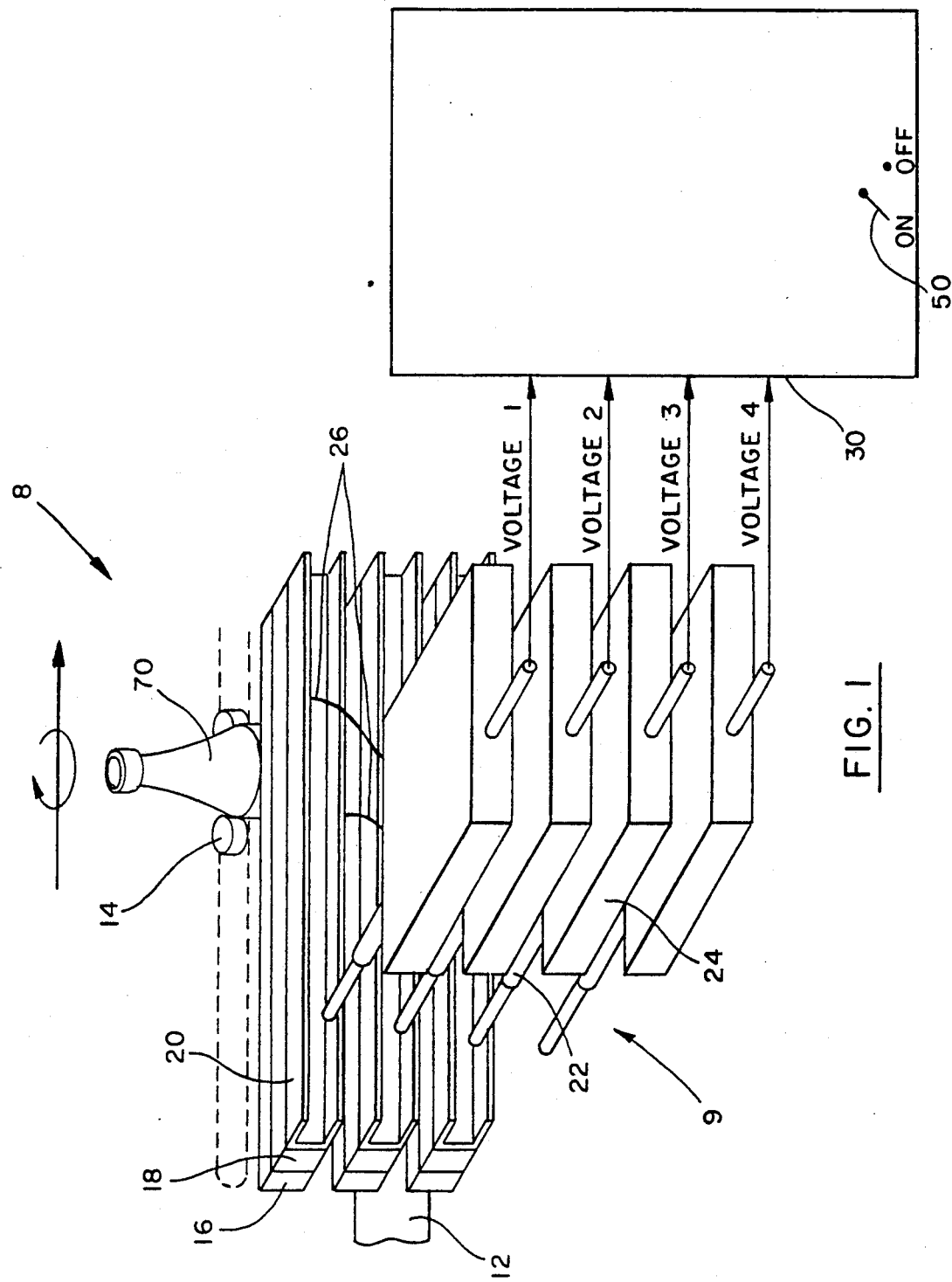
FIG. 1 is an oblique view of a portion of a machine for inspecting the thickness of a glass container.
Figure 4:
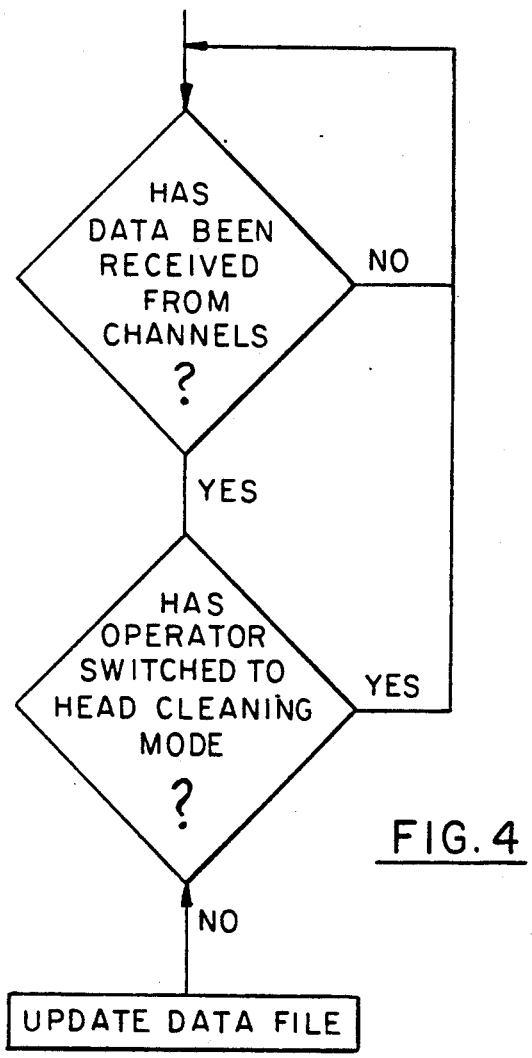
FIG. 4 is a logic diagram showing how the reliability of system data is increased.

The glass container inspection machine 8 has a station for testing a round bottle to which is supported by a support plate 12 and which is advanced along the support plate 12 by a bottle carrier 14. During its displacement past the test station, the carrier 14 forces the bottle against a parallel, horizontally extending and vertically spaced capacitance sensing strips 16 which are secured to resilient foam strips 18 mounted on suitable brackets 20. The brackets are connected by posts 22 to corresponding oscillator assemblies 24 which receive a capacitance signal via calibrated cables 26 and generate voltage signals which are suppled to the computer. Each head oscillator assembly is part of a discrete data channel.

In operation, a glass container which is being conveyed along a path parallel to the strip will engage the strip 32 (FIG. 2) at the leading edge 34 and the channel should develope a voltage signal representative of the wall thickness of the glass container at that time. A test angle location 36 is selected at a point where a voltage signal will be consistently generated and presence of a signal at this location confirms its presence of a bottle. Inspection starts at a begin test location 38 adjacent the test angle and ends at a end test location 40 short of the end 42 of the capacitance strip (off angle).

FIG. 3 illustrates the theoretical digital voltage signal generated by a bottle rolling along this strip. The inspection channel should be inactive (a signal should be absent) before the bottle engages the strip and after it leaves the strip and should be active (a signal should be present) during engagement.

It has been found that cleaning or replacing the the outer layer of tape on the capacitance strips can result in the control concluding that one or more bottles have been inspected and that they are unacceptable. As a result the data file which records rejects by section (there may be up to 12 or more in a machine) and by mold (usually each section has from 1 to 4 molds) will be inaccurate and the percentage of rejects will be higher than actual. This will also cause an incorrect count of the number of bottles inspected. When the operator is to replace, tape or clean a capacitance strip he will switch the system to a Head Cleaning Mode (in FIG. 1, this is schematically illustrated with a switch 50). The system will store which channels were enabled and which channels were off. All channels will then be turned off. As a result all data generated by the channels will be ignored and the Data File will not be changed while the system is in this mode. When this switch 50 is opened, the system will retrieve the stored information on which channels were enabled and which channels were off. The system will then enable all the channels that were in use prior to entering head cleaning mode. At this time acceptance/rejection data will be directed to the Data File to update that file.

I claim:

1. A machine for inspecting the wall thickness of a glass bottle comprising
    a plurality of elongated capacitance strips,
    means for rolling a glass bottle along strips,
    means for generating a voltage signal from each of said strips representative of bottle wall thickness as the bottle is rolled along said strips,
    means for evaluating the voltage signals and accepting or rejecting the inspecting bottle,
    means for maintaining a data file for tracking the number of rejected bottles and the mold in which it was made, and the number of bottle inspected, and
    means for preventing the updating of said data file during head cleaning.

2. A machine for inspecting the wall thickness of a glass bottle according to claim 1 wherein said data file includes the identification of all bottle rejection by section and by mold.

* * * * *